United States Patent [19]

Lucek

[11] Patent Number: 4,935,388
[45] Date of Patent: Jun. 19, 1990

[54] ROLLING CONTACT BEARINGS, MATERIAL FOR BEARING SURFACES, AND PROCESS THEREFOR

[75] Inventor: John W. Lucek, Worcester, Mass.
[73] Assignee: Norton Company, Worcester, Mass.
[21] Appl. No.: 728,433
[22] Filed: Apr. 29, 1985
[51] Int. Cl.$^5$ ............................................. C04B 35/58
[52] U.S. Cl. ....................................... 501/97; 252/12; 264/60; 264/63; 384/907; 384/910; 384/913; 501/122; 501/123
[58] Field of Search .......................... 501/97, 122, 123; 264/60, 63; 384/907, 910, 913; 252/12

[56] References Cited

U.S. PATENT DOCUMENTS

| | | | |
|---|---|---|---|
| 3,836,374 | 9/1974 | Richerson | 501/97 |
| 4,073,845 | 2/1978 | Buljan et al. | 501/97 |
| 4,264,547 | 4/1981 | de Pous | 501/98 |
| 4,350,771 | 9/1982 | Smith | 501/97 |
| 4,388,085 | 6/1983 | Sarin et al. | 501/97 |

FOREIGN PATENT DOCUMENTS 59-184771  10/1984  Japan ...................................... 501/97

OTHER PUBLICATIONS

McLaughlin, J. J., "Alternate Ceramic Roller Bearing Program Final Report" Final Report on NASC Contract N00019-81-C-0284, Nov. 1983.
Glover, D., "A Ball-Rod Rolling Contact Fatigue Tester", ASTM STP 771, American Society for Testing and Materials, 1982.
Baumgartner, H. R. et al, "Ceramic Materials in Rolling Contact Bearings", Final Report on NASC Contract N00019-75-C-0197, Oct. 1976.
Baumgartner, H. R. et al, "Silicon Nitride in Rolling Contact Bearings", Final Report on NASC Contract N00019-76-C-0157, Aug. 1975.
Baumgartner, H. R. et al, "Finishing Techniques for Silicon Nitride Bearings", Final Report on ARMY Contract DAAG46-74-C-0055, Mar. 1976.
Lucek, J. W. et al, "Investigation of the Use of Ceramic Material in Aircraft Engine Bearings", Final Report on Contract NASC N00019-767-C-0251, Jun. 1979.
Lucek, J. W. et al, "Severe Environment Testing of Silicon Nitride Rolling Elements", Final Report on NASC Contract N00019-77-C-0551, Nov. 1979.

Primary Examiner—Stephen J. Lechert, Jr.
Attorney, Agent, or Firm—Arthur A. Loiselle, Jr.

[57] ABSTRACT

The reliability of silicon nitride bodies for use in bearings can be greatly improved by control of microstructural flaws which produce bright specular reflections when metallographically prepared surfaces of the composites are examined microscopically in low angle incident light, dark field reflected light, or reflected polarized light viewed through a crossed polarizing analyzer. The population of such flaws can be controlled by modestly increasing the normal amount of intergranular phase and longer than normal milling times before sintering. Size classification of the powder before compression also improves the performance of the body.

The fatigue cycles to failure of ten percent of the silicon nitride surfaces tested at 6.9 GPa contact stress in accelerated bearing failure ASTM Test STP 771 ($L_{10}$ parameter) for sintered bodies prepared according to this invention is increased by about an order of magnitude over the values obtained with the best previously known type of silicon nitride body for bearing applications.

15 Claims, 5 Drawing Sheets

52X $L_{10}$ = 0.04 MILLON STRESS CYCLES

FIG.1

52X $L_{10}$ = 0.58 MILLON STRESS CYCLES
NC-132

ROLLING CONTACT BEARINGS, MATERIAL FOR BEARING SURFACES, AND PROCESS THEREFOR

BACKGROUND OF THE INVENTION

1. Field of the Invention

The U.S. Government has a paid-up license in this invention and the right in limited circumstances to require the patent owner to license others on reasonable terms as provided for by the terms of Contract No. N00140-82-B068 awarded by the Naval Air Propulsion Center.

This invention is related to materials useful for mechanical bearings, more particularly rolling contact bearings, such as ball bearings, roller bearings, and various designs of needle bearings. It is still more particularly related to ceramics used for such purposes and composed of grains of silicon nitride or oxynitride bonded into a coherent whole by an intergranular phase which is composed primarily of metal oxides.

2. Technical Background

Ceramic materials have been widely recommended but less widely used for bearing applications. In particular, silicon nitride and oxynitride polycrystalline ceramics, with their high wear resistance, low coefficient of thermal expansion, high melting point, and adaptability to fine machine finishing, have been highly recommended for rolling contact bearings. A report by J. J. McLaughlin, "Alternate Ceramic Materials for Roller Bearings", Final Report on NASC Contract N00019-81-C-0284, issued in November of 1983, concluded that Norton Company's pressure densified silicon nitride material described in U.S. Pat. No. 3,836,374 and sold under the designation NC-132 was the best commercially available material for rolling contact bearings. Nevertheless, actual uses of this material for bearings have been relatively few. In part, this is because of relatively high cost of the ceramic and in part because of a tendency of even the best previously known ceramics to a substantial incidence of early mechanical failures when used in bearings.

The long life of practical bearing surfaces makes life testing under actual service conditions uneconomical. It is therefore common practice in the art to rely on accelerated testing procedures, specifically those for ceramics as described by D. Glover in ASTM STP 771. These test procedures apply contact pressures higher than those normally encountered in service in order to accelerate the fatigue failure of the test materials. The tests use statistical analysis of data from testing numerous specimens, and the results are commonly given in terms of a variable $L_x$, which denotes the number of stress cycles which cause failure of X percent of the specimens tested at a given stress level. $L_{10}$ and $L_{50}$ values are frequently reported, and the difference between them indicates the tendency of the material tested to random early failure when used as a bearing surface.

If $L_{10}$ for a material is very much smaller than $L_{50}$, the average lifetime of bearings made from the material may be satisfactorily long, but the early failure incidence represented by a low value of $L_{10}$ may economically preclude most uses of the material because of the substantial danger of premature failure in too many instances.

Results of accelerated tests of this type are routinely used to predict bearing life in practical applications and give good agreement with observed service lifetimes, as demonstrated by the high reliability of most metallic rolling contact bearings in common use.

For the NC-132 material noted above, the $L_{10}$ value in tests with a 6.9 gigapascals (GPa) contact stress is about six hundred thousand cycles, while the $L_{50}$ value is almost eight million cycles. This relatively large ratio between the two numbers accords well with the small but persistent early failure experience with silicon nitride bearings already noted.

Investigations under the general aegis of H. R. Baumgartner over more than a decade, reported in a series of contract reports to various government agencies, and some other prior investigations by the applicant, have been directed to improving the properties of silicon nitride for bearings, but so far as is known to the applicant, no significant improvements in bearing reliability over that of NC-132 has been previously achieved.

Baumgartner has most recently concluded that $L_{50}$ values for ceramic materials can not be predicted from the mechanical strength of the materials. ("Ceramic Materials in Roller Contact Bearings", Final Report on NASC Contract N00019-C-0197, October, 1976). Also in this report, Baumgartner reported microstructural heterogeneities in the ceramic materials tested, but found no statistically significant correlation between the heterogeneities and either $L_{50}$ or $L_{10}$.

In another part of this work, the amount and distribution of intergranular phase material was investigated as a possible source of early failure, but was not found to be correlated. As part of this investigation, silicon nitride ceramics with up to three times the normal amount of magnesium oxide, a major constituent of the intergranular phase, were prepared. These were reported to have an $L_{10}$ value of less than one million stress cycles even at the reduced stress level of 5.25 GPa.

Baumgartner concluded that the cause for early failures in ceramic bearings is unknown but appears to be distinct from the cause of average bearing lifetimes with the same materials.

U.S. Pat. No. 4,216,021 to Hattori et al describes high strength sintered silicon nitride composite materials which are asserted to be "well suited as materials for structural bodies in which dynamic stress such as impact, fatigue or the like is an important factor." No specific reference to use of the materials in bearings was made, however, and there was no report of any $L_x$ values or of optical measurement of flaws. Yttria and titanium nitride were described as necessary components of the ceramic materials invented.

U.S. Pat. No. 4,119,475 to Prochazka et al describes sintering of silicon nitride mixed with a magnesium additive and a beryllium additive. This patent is only remotely related to the instant application, inter alia because it teaches away from using an oxide sintering aid (column 1, lines 54–58) and uses conventional sintering rather than high pressure densification. Like Hattori, Prochazka makes no reference to use in bearings or to $L_x$ values.

Various conventional techniques of optical examination of silicon nitride ceramic bodies have been applied and reported by other investigators, but none of them has reported any correlation known to the applicant between any particular type of optical characteristic of polycrystalline silicon nitride ceramics and their lifetimes under accelerated fatigue testing for bearing applications or under actual service in bearings.

SUMMARY OF THE INVENTION AND BRIEF DESCRIPTION OF THE DRAWINGS AND TABLES

I have found that bearing materials with more reliably long service lives than ever previously achieved, specifically with an $L_{10}$ value of more than five million stress cycles at 6.9 GPa stress, can be obtained with silicon nitride or oxynitride ceramic bodies by controlling the incidence within the bodies of optical flaws of a specific type not regarded as significant heretofore. (These flaws have probably drawn little attention from previous workers because they have no evident effect on such commonly measured properties as average bend strength, dispersion of bend strength, fracture energy, or resistance to machining damage.) The flaws found to be critical for control of early fatigue failure can be detected by microscopic examination in low angle incident light, dark field reflected light, or reflected polarized light viewed through a crossed polarizing analyzer. If the flaws are large enough, they may be visible even without magnification.

Flaws of the type critical for $L_{10}$ values are shown in the drawings.

FIG. 2 shows the surface of NC-132 under the same magnification and illumination conditions as in FIG. 1. While there is much less reflection overall than in FIG. 1, there still are numerous contrasting light reflections widely dispersed throughout most of the surface.

Tables 1 and 2 summarize rolling contact fatigue performance and its comparison with optical and other mechanical properties for various silicon nitride composites.

Control of the incidence of flaws of the type inimical to high $L_{10}$ values can be achieved by a variety of techniques, including the use of moderately high amounts of intergranular phase forming additives before sintering, longer milling times, and elimination of large size aggregates before pressure densification.

By using the superior materials described herein for their stress contact surfaces, bearings otherwise conventional in design but with reliably longer life than any previously known can be obtained.

DESCRIPTION OF THE PREFERRED EMBODIMENTS

Surface preparation of the rolling contact bearing materials must be carefully controlled for reliable results in the tests described below or in actual service as bearings. Scratches, rough finish, and subsurface damage all can have substantial negative impact on performance or test results. An optimized finishing procedure was developed and reported by J. Lucek and Cowley,'-'Ceramic Materials in Aircraft Engine Bearings", Final Report on Contract NASC N00019-76-C-0251, June 1979. See McLaughlin reference, Appendix A. Test specimen manufacturing procedures as described in this excerpt were used for all the testing reported herein. Similar procedures, with any necessary or appropriate modification as appropriate to those skilled in the art of bearing design, are preferred for making practically useful bearings from the materials described herein.

Figure 1:
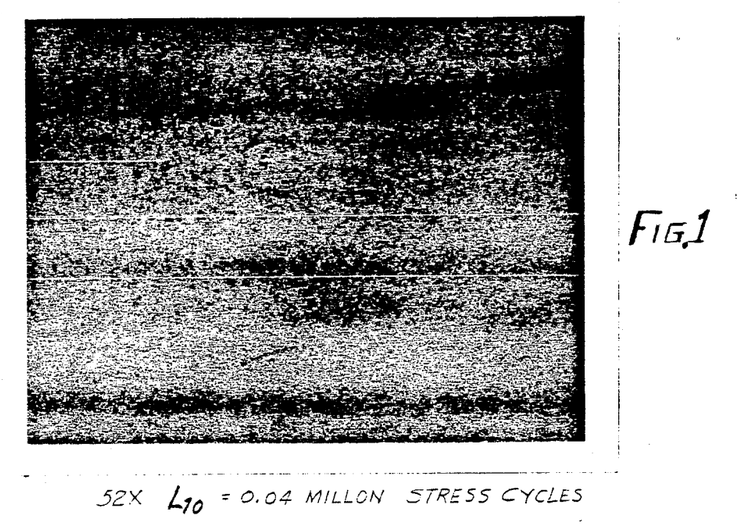
FIG. 1 is a photomicrograph at 52× magnification of a finely ground surface of a conventional silicon nitride body viewed through a crossed polarizer while illuminated by reflected polarized light. The extended, branched, and feathery lightest features, somewhat reminiscent of the veining of marble, shown in the photomicrograph are the indicia of the flaws which are characteristic of ordinary silicon nitride bodies with low $L_{10}$ values.

All the superior silicon nitride materials according to this invention were found to be characterized by a reduced incidence, compared with conventional silicon nitride bodies, of bright specular reflections from the generally black surfaces of the bodies, when these are illuminated by low angle incident ordinary light, dark field reflected light, or reflected polarized light with a crossed analyzer. These reflections are distinct from those originating from pores or polishing defects. The superior materials contain smaller optically reflective flaws than the best commercially available silicon nitride bearing materials. The small inclusions which are present in the superior materials are more nearly uniformly distributed than in normal silicon nitride ceramics. Depending on the distribution and size of these optical anomalies, magnification may or may not be required to detect them. An example of the reflections is shown in FIG. 1.

Electron probe microanalysis, selective chemical etching, and preferential physical erosion during standard metallographic sample preparation indicate that these reflective optical regions, called anomalies herein, are different from the surrounding silicon nitride matrix. Microchemical analysis by electron beam suggests that these anomalies, which are not the sort of gross flaws commonly associated with general mechanical weakness, contain higher than normal concentrations of the intentionally added intergranular phase constituents (such as magnesia and silica) and of less refractory minor impurities. Nevertheless, the anomalies can not simply be equated with the intergranular phase, because the anomalies occupy a larger fraction of the total volume of the specimens than the amount of intergranular phase possible in view of the amount of constituents of that phase present in the ceramics.

The optical properties of the anomalies suggest that they have higher porosity, increased levels of microcracks, or increased transparency compared with the surrounding bulk of the material. Irrespective of what reasons(s) may give rise to the optical anomalies, control of the level of such anomalies has proved to be the most reliable technique for obtaining materials with high $L_{10}$ values.

The ROSIWALL micrometric quantitative analysis typically used for mineralogical composition analysis was used to quantify the volume of the reflective component in the composite materials reported herein. This standard technique is described in most optical microscopy texts and assumes an isotropic material. See e.g., E. W. Heinrich, *Microscopic Petrography*, 1956; E. E. Wahlstrom, *Igneous Minerals and Rocks*, 1950. A Leitz Ortholux microscope equipped with a Hunt-Wentworth recording micrometer was used in a reflected polarized light mode with a crossed analyser to ascertain the volume fraction of the reflective microstructural component at 150× magnification.

The mechanical behavior of stressed materials may be predicted by the "weakest link" theory stating that a material will fail at its weakest point; i.e., where the largest flaw occurs. The largest flaws visible in the material were characterized by visually selecting from 8 to 10 fields @ 150× the largest flaw and tabulating the average size of these 8 - 10 flaws as well as the largest anomaly viewed. Approximately 5,000–10,000 flaws were sampled by this analysis, see for example Table 2. Three separate 12 mm long scans, sampling a total of more than five hundred reflective flaws, were made with the microscope for each volume determination reported.

The silicon nitride powder to be used for making the products according to this invention is preferably made as described in U.S. Pat. No. 3,836,374, the entire specification of which is hereby incorporated herein by reference. A single lot of silicon nitride powder was prepared and used for all the examples reported below to eliminate variation from that source.

The silicon nitride powder was mixed with appropriate quantities of intergranular phase constituents, milled, and densified as described in U.S. Pat. No. 3,836,374, and the specimens for rolling contact fatigue testing were sliced from the resulting billets and finished by standard techniques, with the final finishing for all specimens unless otherwise specified performed in accordance with Appendix A of the already cited final report on NASC Contract N00019-81-C-0284. This procedure yielded a surface roughness between 0.052 and 0.077 microns arithmetic average.

Photomicrographs were obtained on a metallograph under conditions of reflected, polarized, Koehler illumination with an inserted crossed analyzer at a magnification of 52 X unless otherwise stated. Flexural strength and the indentation fracture toughness value (K1C) were measured by standard methods. The nominally applied Hertzian contact pressure was calculated by conventional practice, ignoring the hydrodynamic redistribution of stress by the lubricating film. Intergranular phase volume percents were calculated from combining the silicon dioxide stoichiometrically equivalent to the oxygen content of the silicon nitride powder with the added (magnesia or yttria) intergranular oxides and calculating the resulting volume from phase densities determined by X-ray analysis.

Figure 2:
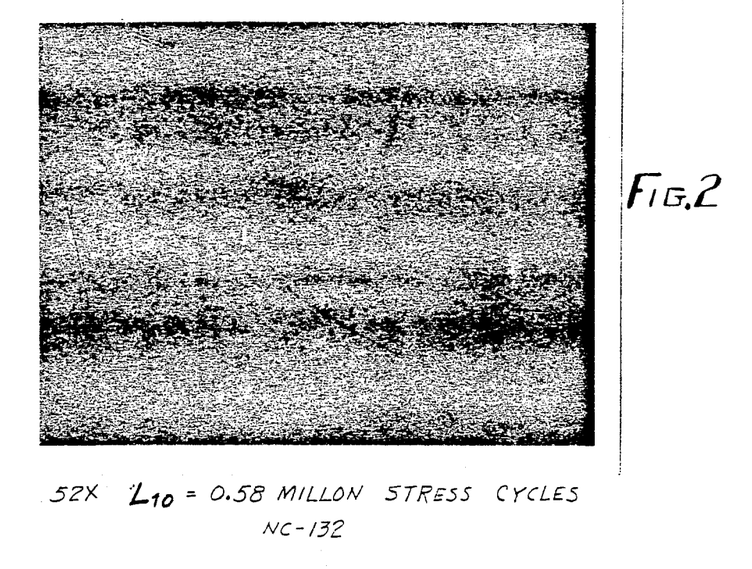

Fatigue life and other data were obtained for commercial NC-132 silicon nitride bodies to obtain baseline data for comparison with the examples below. The results are shown in Table I and FIGS. 7 and 8. The microstructure of NC-132 shown in FIG. 2 is characterized by a well dispersed population of optical anomalies less than 20 microns in diameter. The largest single contiguous optically reflective anomaly detected in this sample was 73 microns in diameter. The average largest flaw detected as described above was 41 microns in diameter. The intergranular phase volume in this material is about 5.5 volume percent, while the reflective anomalies occupied 21-24 percent of the volume of the sample. Under applied contact stress of 6.9 GPa, this NC-132 material had $L_{10}$ and $L_{50}$ values of 0.6 and 7.7 million cycles respectively. This wide difference is accentuated by the accelerated test procedure but is indicative of the problems observed practically when using this material in bearings.

Figure 3A:
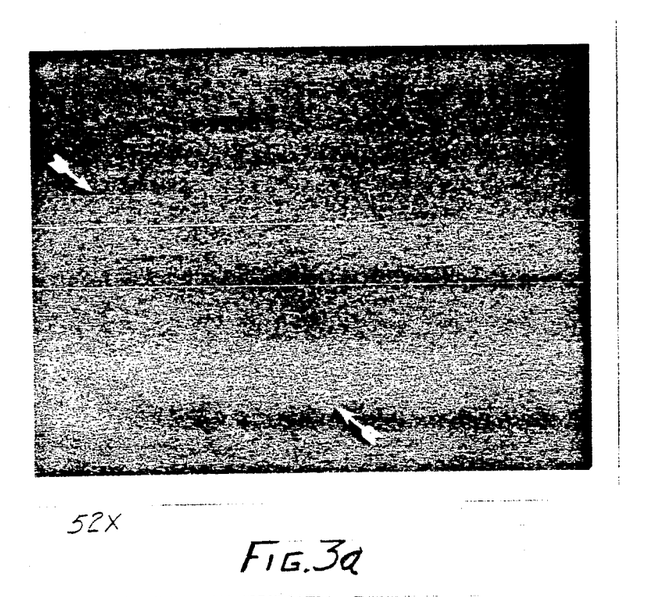
FIG. 3a shows reflections under the same illumination conditions from the surface of a high strength, high fracture energy type of silicon nitride with 8% yttria added as a sintering aid. Very large scale patterns of the light anomalies are present.
Figure 3B:
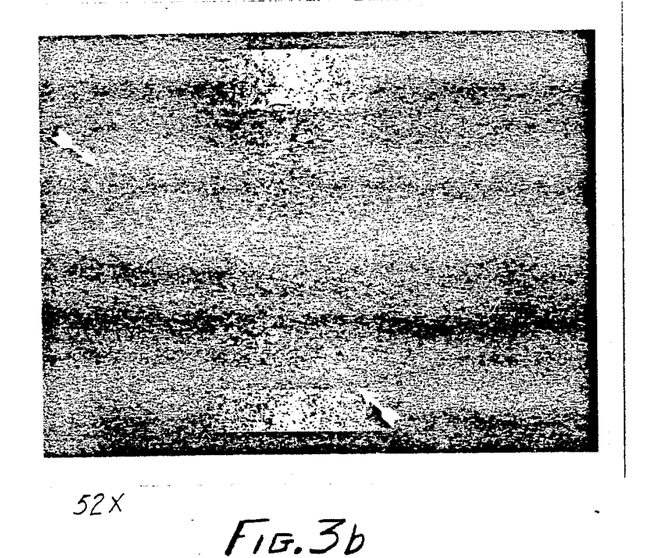
FIG. 3b shows in reflected light the same area of the same sample after very short exposure to a bearing wear test. Significant erosion of the surface in a pattern closely related to that of FIG. 3a is evident.

To provide further comparison for the improved materials of this invention, a high strength silicon nitride ceramic with significantly improved resistance to machining damage and a higher fracture energy was prepared. Previously referenced arguments by Baumgartner, the applicant, and others suggest that improvements in these mechanical characteristics should also improve rolling contact fatigue life. In reality, however, the $L_{10}$ and $L_{50}$ values for this high strength silicon nitride were only 0.01 and 0.22 million cycles, not even one tenth as much as NC-132. FIGS. 3a and 3b illustrate the relationship between microstructure and performance in a bearing environment for this material. The high concentration of optical flaws visible in 3a and their coincidence with the surface spalls visible in 3b after testing are apparent.

This high strength material contains optical anomalies with a largest single contiguous flaw diameter of 233 microns and an average of the diameters of the largest flaw of 147 microns, both much larger than the corresponding values for NC-132. The volume fraction of the reflective flaws is 28–31%, a comparatively slight increase over NC-132. The reflective regions in this material are very pronounced, suggesting a large difference in composition, density, and/or modulus between most of the material of the flaw and the bulk material.

Spalling at the optically reflective regions controls the fatigue life of this high strength material. Analysis of the early fatigue failures of NC-132 show that these anomalies appear to control the early fatigue failures in NC-132 silicon nitride. The improved performance of NC-132 over the material shown in FIGS. 3a and 3b is believed to be connected with both the lower incidence and the less deleterious quality of flaws of this type.

The following examples illustrate embodiments of this invention.

EXAMPLE 1

Figure 4:
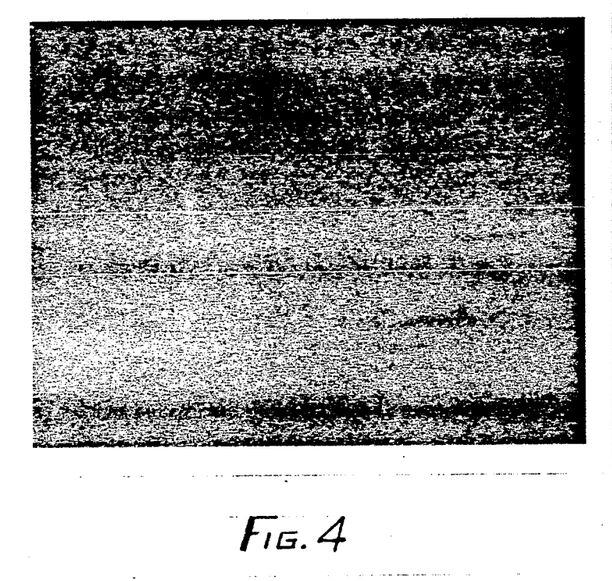
FIGS. 4, 5 and 6 are photomicrographs under similar conditions to FIG. 1 of surfaces of improved bodies prepared according to this invention. It is evident that the total number and size of reflective anomalies is less than in any of the previous figures.

For this invention, the preparation of NC-132 as described in U.S. Pat. No. 3,836,374 was varied by using 3% rather than 1% of magnesium oxide addition to the silicon nitride powder. This resulted in a total intergranular phase volume of 7.5% calculated based on the chemical composition of the body. It was hypothesized that one of the causes of the optical anomalies found in standard NC-132 was suboptimal mixing of the intergranular phase constituents, and that three times the normal amount of magnesia additive would be more uniformly distributed than the normal amount under constant blending conditions. Whether or not this is the actual cause, the result was successful. The optical characteristics of the products prepared from this mixture are shown in FIG. 4. The reflective flaws constitute 14–16% of the volume of the material and as shown by FIG. 4 are very diffuse, suggesting a more gradual composition gradient near the flaws. Such a gradual change in composition is likely to reduce stresses near the reflective material.

Figure 7:
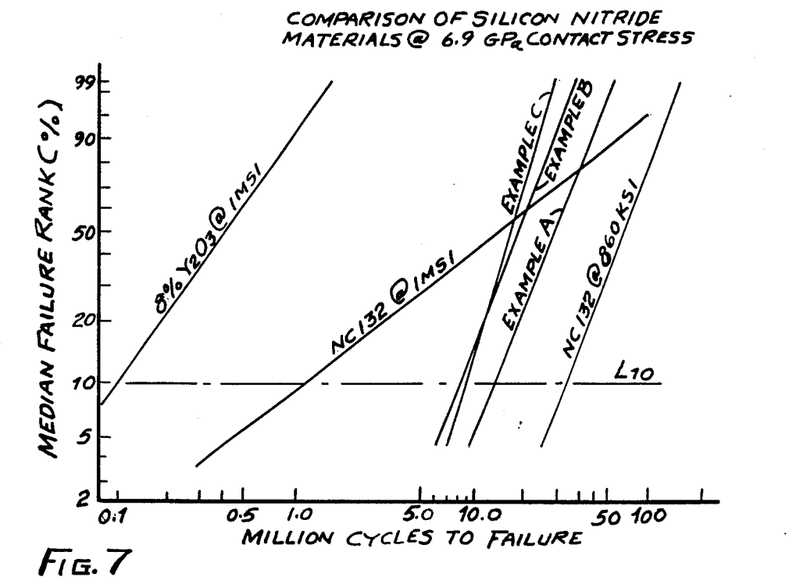
FIG. 7 shows the $L_x$ function previously defined for a variety of ceramic and metallic materials at varied contact stress levels.
Figure 8:
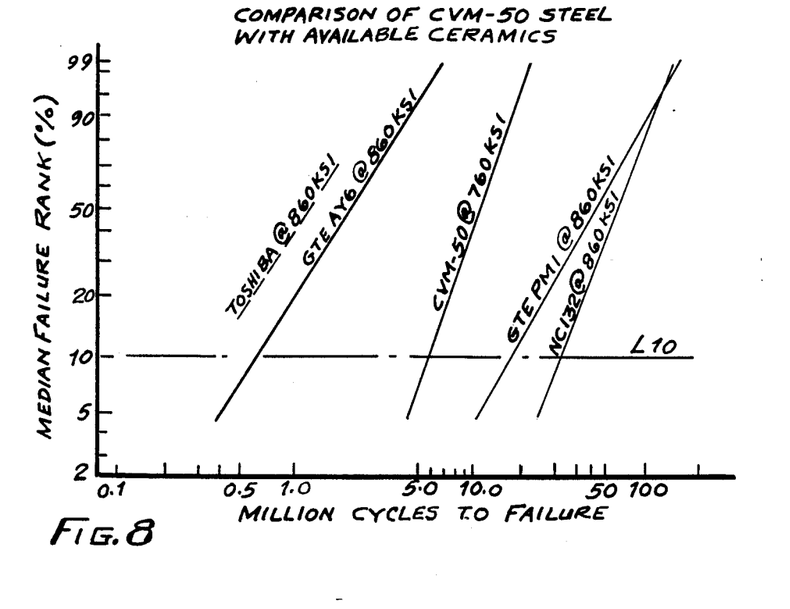

The largest single contiguous flaw detected in this material was 48 microns in diameter, while the average largest flaw diameter was 35 microns. The $L_{10}$ fatigue life at 6.9 GPa stress was 10.5 million cycles, almost ten times higher than for NC-132. Additional values are shown in FIG. 7. The $L_{50}$ value, 13.2 million cycles, is comparatively close to that of NC-132, as are the strength and toughness.

When the improvement in final properties is achieved, as in this Example, by increasing the amount of intergranular phase material over that present in NC-132, it is preferable to restrict the intergranular phase volume to no more than ten percent of the total volume of the final product. Higher amounts of intergranular phase may segregate unduly during high temperature processing and lead to less reliable final materials.

EXAMPLE 2

Figure 5:
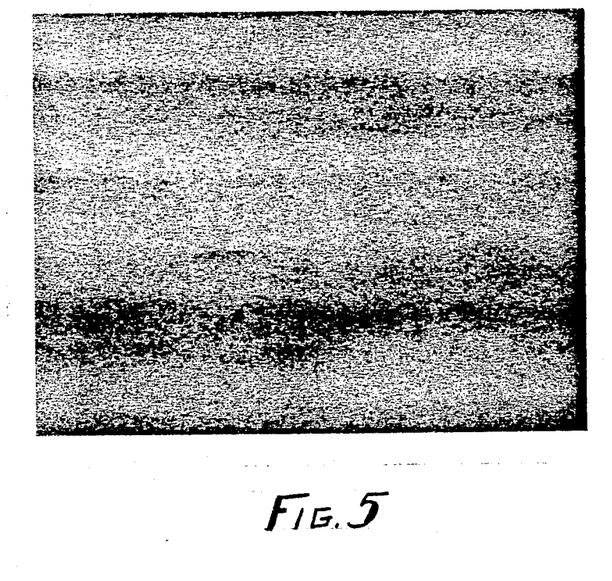

For this example, 1.5% magnesia was used to give a calculated volume of 6% intergranular phase. The powder was milled twenty-four hours, twice as long as normal for NC-132, before hot pressing. This additional milling time increased the concentration of tungsten carbide fines in the powder more than three times over the normal value for NC-132. Because the tungsten carbide inclusions are known to have a deleterious effect on bulk strength, a contrast between the effect of bulk flaws and the special optical anomalies noted here was possible. Critical fracture toughness and notch sensitivity were not reduced for the products from this example compared with normal silicon nitride, but strength was slightly reduced as expected. The optical properties are shown in FIG. 5. The flaws in this material are roughly equal in contrast to those of NC-132 but are smaller and sparser, intermediate between values for NC-132 and the product of Example 1, as shown in Table 2. Correspondingly, the $L_{10}$ value was found to be 4.53 million cycles, as shown on FIG. 7. This material contained approximately 20γ/o reflective material with a maximum diameter of 38 μm and an average maximum of 20 μm.

EXAMPLE 3

Figure 6:
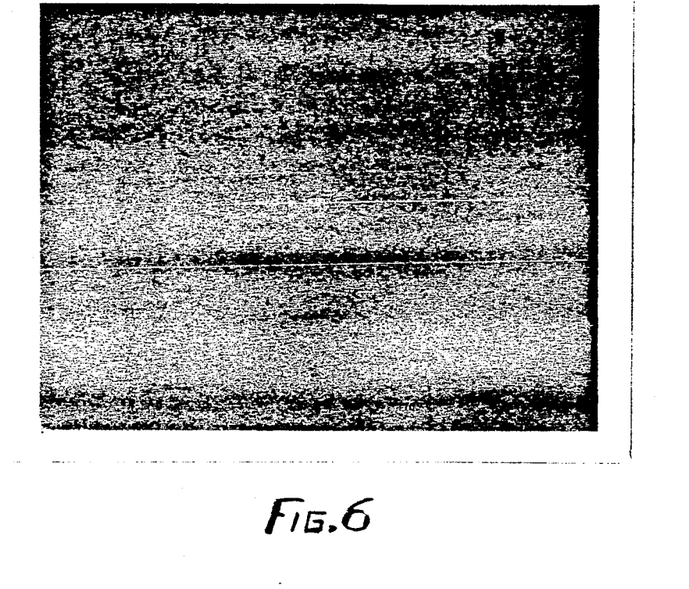

In this example, all practices for the preparation of conventional NC-132 were followed, except for the introduction of an air classification step after powder milling and drying. This removed all agglomerates greater than 5 microns in diameter prior to densification. The resulting products had lower bulk strength and resistance to machining damage than standard NC-132, but the fatigue $L_{10}$ life under 6.9 GPa stress was 6.07 million cycles, more than ten times better than for NC-132. The reflective optical characteristics are shown in FIG. 6. The flaws are not as sharply defined as in NC-132 but more sharply than in Example 1. Quantification of the optical reflections is shown in Table 2. Of the three Examples, this is closest in these figures to NC-132 but still clearly lower. The similarity of this data to the NC-132 material suggests that the air classification procedure improves the RCF performance by a separate mechanism different from the optical flaw population.

From the data in Table 2 and other similar data not shown in detail, I have concluded that the improved early fatigue resistance properties of silicon nitride bodies according to my invention can be correlated with the size and volume of the optical anomalies. One method of distinguishing the products according to this invention from the materials of the prior art is to measure the size and volume of the optical anomalies by the described methods. The examination for flaws is made on a metallographically polished surface of a specimen of the material under one of the illuminated conditions already described. The randomly selected diameter of the largest reflective anomaly for 8-10 fields is measured, and values thus obtained are averaged. The average determined by this procedure is denoted the average largest flaw, and if this average is less than 40 microns, the silicon nitride body falls within the scope of my invention.

An alternative criterion randomly selected involves measuring the largest flaw in 8-10 fields and extracting the largest value obtained for tabulation. If it is 70 microns or less, the silicon nitride body also falls within the scope of my invention. Preferably the absolute maximum value should be not more than 50 microns. Alternatively the volume of flaws may be determined as described. Materials with less than 20 volume % fall within the scope of this invention. Preferred materials meet both the size and volume requirements.

FIG. 7 shows the statistically derived fatigue life performance of the more important silicon nitride materials described herein. The $L_{10}$ values are at the intersection of the lines representing each material with the dotted horizontal line on the Figure. A detailed description of the method of statistical fatigue analysis used to prepare this Figure may be found in W. Johnson, *The Statistical Treatment of Fatigue Experiments*, 1964.

For comparison, a similar curve, but at a lower stress level, for CVM-50 bearing steel, a premium material currently used commercially for bearings, is shown on the Figure in dashed lines. The slope of the line for this steel is much higher than that for the earlier silicon nitride bearing materials known in the art but close to that of the materials produced in the three examples of embodiments of the instant invention. Thus the materials provided by this invention combine the high reliability of current bearing steels with the much greater average life of previously known silicon nitride materials, which were all susceptible to early failures in a significant fraction of their total applications. The greater average life of silicon nitride materials is indicated by the fact that the steel shown on the Figure can not survive even a few cycles at the 6.9 GPa stress level at which the average lives ($L_{50}$) of all the silicon nitride materials shown was more than one-half million cycles.

TABLE 1

| | MECHANICAL PROPERTIES AND FATIGUE PERFORMANCE OF SILICON NITRIDE MATERIALS | | | | | |
|---|---|---|---|---|---|---|
| MATERIAL | FLEXURAL STRENGTH (KSI 4 Point) | FRACTURE TOUGHNESS KIC (KSI $\sqrt{in.}$) | NOTCH SENSITIVITY (%) | FATIGUE LIFE CONTACT STRESS (KSI) | MILLIONS OF CYCLES $L_{10}$ | $L_{50}$ |
| CVM-50 | | | | 760 | 2.8 | 5.6 |
| Best Commercial Si3N4 | 117 | 5.0 | .67 | 860 | 11.8 | 93.4 |
| Bearing Material | | | | 1000 | .58 | 7.70 |
| High Strength Si3N4 | 129 | 6.9 | .93 | 1000 | 0.01 | 0.22 |
| Example A | 124 | 5.9 | .74 | 1000 | 5.42 | 14.25 |

TABLE 1-continued
MECHANICAL PROPERTIES AND FATIGUE PERFORMANCE OF SILICON NITRIDE MATERIALS

| MATERIAL | FLEXURAL STRENGTH (KSI 4 Point) | FRACTURE TOUGHNESS KIC (KSI $\sqrt{in.}$) | NOTCH SENSITIVITY (%) | FATIGUE LIFE CONTACT STRESS (KSI) | MILLIONS OF CYCLES $L_{10}$ | $L_{50}$ |
|---|---|---|---|---|---|---|
| Example B | 104 | 5.3 | .67 | 1000 | 4.53 | 9.74 |
| Example C | 92 | 5.0 | .62 | 1000 | 6.07 | 9.78 |

TABLE 2
ROLLING CONTACT FATIGUE PERFORMANCE
6.9 GPa Hertzian Contact Stress

| MATERIAL | $L_{10}$ FATIGUE LIFE | FLAW VOL. FRACTION | AVG. MAX. FLAW DIAM. | MAXIMUM FLAW DIAM. |
|---|---|---|---|---|
| Best commercial silicon nitride | 5.80E + 05 | 21–24 | 73 | 41 |
| High Strength | 1.00E + 04 | 28–31 | 233 | 147 |
| Example 1 | 5.42E + 06 | 14–16 | 48 | 35 |
| Example 2 | 4.53E + 06 | 16–22 | 38 | 20 |
| Example 3 | 6.07E + 06 | 22–27 | 56 | 36 |

NOTE:
Contiguous flaw diameters in micrometers
E = exponent base 10

I claim:

1. A ceramic material comprising a predominant volume of grains of silicon nitride or silicon oxynitride bonded together by an intergranular phase, said ceramic material having an $L_{10}$ value of at least four million stress cycles in ASTM test STP 771 under 6.9 gigapascals applied contact stress.

2. A material according to claim 1, wherein said intergranular phase occupies less than one tenth of the total volume of the material.

3. A ceramic material comprising a predominant volume of granules of silicon nitride or silicon oxynitride bonded together by an intergranular phase, said ceramic material having an average largest flaw as described, of less than 40 μm.

4. A ceramic material comprising a predominant volume of granules of silicon nitride or silicon oxynitride bonded together by an intergranular phase, said ceramic material having optical heterogeneities the largest of which is not more than 70 microns in diameter.

5. A material according to claim 4, wherein said maximum value is not more than 50 microns.

6. A material according to claim 2, comprising not less than 1.5 percent by weight of magnesium oxide.

7. A rolling contact bearing incorporating a bearing surface consisting predominantly of a material according to claim 6.

8. A rolling contact bearing incorporating a bearing surface consisting predominantly of a material according to claim 5.

9. A rolling contact bearing incorporating a bearing surface consisting predominantly of a material according to claim 4.

10. A rolling contact bearing incorporating a bearing surface consisting predominantly of a material according to claim 3.

11. A rolling contact bearing incorporating a bearing surface consisting predominantly of a material according to claim 2.

12. A rolling contact bearing incorporating a bearing surface consisting predominantly of a material according to claim 1.

13. In a process for the manufacture of ceramic material comprising the steps of mixing a predominant amount of fine silicon nitride or silicon oxynitride powder with a minor amount of a finely ground binder material, said binder material comprising a predominant amount of oxides or carbonates of alkaline earth metals or mixtures thereof, milling the mixture of ceramic and binder material for at least six hours in a liquid dispersant, drying the milled mixed powder under sufficient pressure and heat to densify it into a coherent body, the improvement wherein the dried milled mixed powder is size classified before compression so as to eliminate from the compressed powder any aggregate having a diameter greater than five microns.

14. In a process for the manufacture of ceramic material comprising the steps of mixing a predominant amount of fine silicon nitride or silicon oxynitride powder with a minor amount of a finely ground binder material, said binder material comprising a predominant amount of oxides or carbonates of alkaline earth metals or mixtures thereof, milling the mixture of ceramic and binder material for at least six hours in a liquid dispersant, drying the milled mixed powder, and compressing the dried milled mixed powder under sufficient pressure and heat to density it into a coherent body, the improvement wherein said milling of the mixture of ceramic and binder material is continued for at least twenty-four hours.

15. A material according to claim 1 wherein the volume of optical anomalies is <20% of the total material.

* * * * *